United States Patent
Fisher (10) Patent No.: US 8,660,356 B2
(45) Date of Patent: Feb. 25, 2014

(54) RECOGNIZING TEXT AT MULTIPLE ORIENTATIONS

(75) Inventor: Maurice D. Fisher, Wake Forest, NC (US)

(73) Assignee: Adobe Systems Incorporated, San Jose, CA (US)

(*) Notice: Subject to any disclaimer, the term of this patent is extended or adjusted under 35 U.S.C. 154(b) by 3 days.

(21) Appl. No.: 13/459,862

(22) Filed: Apr. 30, 2012

(65) Prior Publication Data

US 2013/0177201 A1 Jul. 11, 2013

Related U.S. Application Data (63) Continuation of application No. 12/363,434, filed on Jan. 30, 2009, now Pat. No. 8,175,388.

(51) Int. Cl.
*G06K 9/36* (2006.01)

(52) U.S. Cl.
USPC .......................................... 382/181; 382/289

(58) Field of Classification Search
CPC ... G06K 9/00; G06K 9/2054; G06K 9/00469; G06K 9/222; G06K 9/3208; G06K 9/3275; G06K 2209/01
USPC ......... 382/181, 171, 176, 180, 224, 254, 256, 382/257, 276, 282, 283, 289, 292, 297, 312, 382/317; 358/1.9, 1.11, 462, 2.01, 2.28, 358/1.1, 3.02, 3.1, 3.27; 715/200, 201, 234, 715/243, 255, 762, 273, 781, 221; 345/168, 345/467, 551, 620, 685, 471, 589
See application file for complete search history.

(56) References Cited

U.S. PATENT DOCUMENTS

| | | | |
|---|---|---|---|
| 4,757,551 A | | 7/1988 | Kobayashi et al. |
| 4,926,490 A | | 5/1990 | Mano |
| 5,647,023 A | | 7/1997 | Agazzi et al. |
| 5,832,530 A | * | 11/1998 | Paknad et al. ................. 715/235 |
| 5,959,635 A | | 9/1999 | Watanabe et al. |
| 6,148,102 A | | 11/2000 | Stolin |
| 6,151,423 A | | 11/2000 | Melen |
| 6,233,354 B1 | | 5/2001 | Nakatani |
| 6,256,408 B1 | | 7/2001 | Casey et al. |
| 6,272,495 B1 | * | 8/2001 | Hetherington ........................ 1/1 |
| 6,324,500 B1 | | 11/2001 | Amro et al. |

(Continued)

OTHER PUBLICATIONS

Wikipedia, "Aspect Ratio (Image)", retrieved from http://en.wikipedia.org/wiki/Aspect_ratio_image), modified on Dec. 28, 2008 (10 pages).

(Continued)

*Primary Examiner* — Sheela Chawan
(74) *Attorney, Agent, or Firm* — Finch & Maloney PLLC (57) ABSTRACT

Systems, methods, and apparatus, including software tangibly stored on a computer readable medium, involve identifying text in an electronic document. An electronic document that includes an image object is received. In a first region of the image object, a first set of text characters having a first orientation are recognized. In a second region of the image object, a second set of text characters having a second orientation are recognized. The electronic document is modified to include a first text object identifying the first set of text characters and a second text object identifying the second set of text characters. Each identification of text characters includes a set of values that each represent an individual text character recognized in the corresponding region.

19 Claims, 7 Drawing Sheets

(56) References Cited

U.S. PATENT DOCUMENTS

| | | |
|---|---|---|
| 6,389,178 B1 | 5/2002 | Agazzi et al. |
| 6,701,023 B1 | 3/2004 | Gaither et al. |
| 6,993,205 B1 | 1/2006 | Lorie et al. |
| 7,010,166 B2 | 3/2006 | Ayshi et al. |
| 7,246,880 B2 * | 7/2007 | Ross et al. .................. 347/43 |
| 7,299,224 B2 * | 11/2007 | Doerre et al. .............. 707/722 |
| 7,305,619 B2 | 12/2007 | Kaneda et al. |
| 7,551,780 B2 | 6/2009 | Nudd et al. |
| 7,620,244 B1 | 11/2009 | Collier |
| 7,937,397 B2 * | 5/2011 | Pickens ..................... 707/750 |
| 8,144,989 B2 * | 3/2012 | Speigle et al. ............. 382/177 |
| 8,175,388 B1 * | 5/2012 | Fisher ........................ 382/181 |
| 2004/0161149 A1 | 8/2004 | Kaneda et al. |
| 2007/0165904 A1 | 7/2007 | Nudd et al. |

OTHER PUBLICATIONS

Wikipedia, "Optical Character Recognition", retrieved from http://en.wikipedia.org/wiki/Optical_character_recognition, modified on Jan. 28, 2009 (8 pages).

* cited by examiner

RECOGNIZING TEXT AT MULTIPLE ORIENTATIONS

CROSS-REFERENCE TO RELATED APPLICATION

This application ia continuation of and claims priority to U.S. patent application Ser. No. 12/363,434 entitled "Recognizing Text at Multiple Orientations" filed on Jan. 30, 2009 now U.S. Pat. No. 8,175,388, the disclosure of which is hereby incorporated by reference.

BACKGROUND

The present disclosure relates to optical character recognition (OCR). Computing devices implement OCR to recognize text characters in an image. For example, when an optical scanner scans a paper document and generates a raster image of the document, an OCR tool can search the raster image for a region that resembles text and then identify characters of a text in that region. A conventional OCR process identifies a predominant orientation of text on a page and then recognizes text characters having the predominant orientation on the page. For example, a conventional OCR process can detect that text is oriented at ninety degrees on a page and then recognize text characters having that orientation. The predominant orientation is determined by attempting character recognition for a sample region of a page at multiple orientations (e.g., 0°, 90°, 180°, and 270°) and choosing the page orientation based on the character recognition results for the sample region. In some cases, a conventional OCR process identifies the predominant orientation by calculating an aspect ratio of the input image, by calculating a histogram of the input image and/or by identifying a text baseline in the image.

SUMMARY

This specification describes technologies relating to recognizing characters at multiple orientations in an image.

In general, one aspect of the subject matter described in this specification can be embodied in a method that includes identifying text in an electronic document. An electronic document that includes an image object is received. In a first region of the image object, a first set of text characters having a first orientation in the image object are recognized. In a second region of the image object, a second set of text characters having a second orientation in the image object are recognized. The electronic document is modified to include a first text object containing an identification of the first set of text characters and a second text object containing an identification of the second set of text characters. The identification of the first set of text characters includes a first set of values. Each value in the first set of values represent an individual text character recognized in the first region. The identification of the second set of text characters includes a second set of values. Each value in the second set of values represent an individual text character recognized in the second region. Other embodiments of this aspect include corresponding systems, apparatus, and computer program products.

These and other embodiments can optionally include one or more of the following features. In a third region of the image object, a third set of text characters having a third orientation in the image object are recognized. The electronic document is modified to include a third text object containing an identification of the third set of text characters. The first text object further includes an identification of the first orientation and an identification of the first region, and the second text object further includes an identification of the second orientation and an identification of the second region. The modified electronic document is displayed with the first set of text characters having the first orientation in the displayed document and the second set of text characters having the second orientation in the displayed document. A request to search the modified electronic document for a particular string of text characters is received. The first text object and the second text object are searched for the particular string of text characters. Recognizing the first and second sets of text characters includes identifying that the first and second regions contain an image of text and identifying the first and second orientations, respectively. Identifying the first orientation and/or the second orientation includes calculating an aspect ratio of at least a portion of the first region or the second region, generating a histogram based on pixel values in the first region or the second region, and/or identifying a text baseline in the first region or the second region. Receiving the electronic document includes performing an optical scan of a paper document and/or retrieving electronic data from a machine-readable medium. The image object includes a raster image and recognizing the first and/or second set of text characters includes rotating at least a portion of the raster image. Modifying the electronic document includes generating a derivative electronic document that includes the first text object and the second text object and/or converting at least part of the electronic document to a different file format. Recognizing the first set of text characters includes sending the image object to an optical character recognition engine and receiving a first dataset from the optical character recognition engine. The first dataset includes an identification of the first orientation, an identification of the first region, an identification of the first set of text characters, and an identification of an unrecognized region of the image object. The unrecognized region includes the second region. Recognizing the second set of text characters includes identifying that the unrecognized region includes text, sending at least a portion of the unrecognized region to the optical character recognition engine, and receiving a second dataset from the optical character recognition engine. The second dataset includes an identification of the second orientation, an identification of the second region, and an identification of the second set of text characters. Modifying the electronic document includes storing in the electronic document the first text object, the second text object, an identification of the first orientation, an identification of the second orientation, an identification of the first region, and an identification of the second region. One or more of the described operations can be implemented by a processor in accordance with instructions stored in a memory. Instructions and/or other data can be received from a user interface device and/or an optical scanner communicably coupled to the processor.

Particular embodiments of the subject matter described in this specification can be implemented to realize one or more of the following advantages. Text characters are recognized at multiple orientations in an image. Accordingly, text characters can be recognized in two or more regions of the image, even though the text characters in each region have a different orientation in the image. An electronic document can be modified or generated to include text objects that contain an identification of recognized text and the orientation of the recognized text for each region. The text objects can be included in existing electronic document formats, such as a Portable Document File (PDF). The output document is text-searchable. Thus, a text-search of the output document can search over text at multiple different orientations in an image.

Also, text objects in the output document include an identification of the orientation of the recognized text in the original image. Thus, a graphical representation of the original image can be rendered based on the output document. Text recognition can be used to repurpose text from one or more source documents that contain text at multiple orientations. Text characters recognized at multiple orientations can also be used to aid in electronic data indexing, data mining, and/or other data management tasks.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
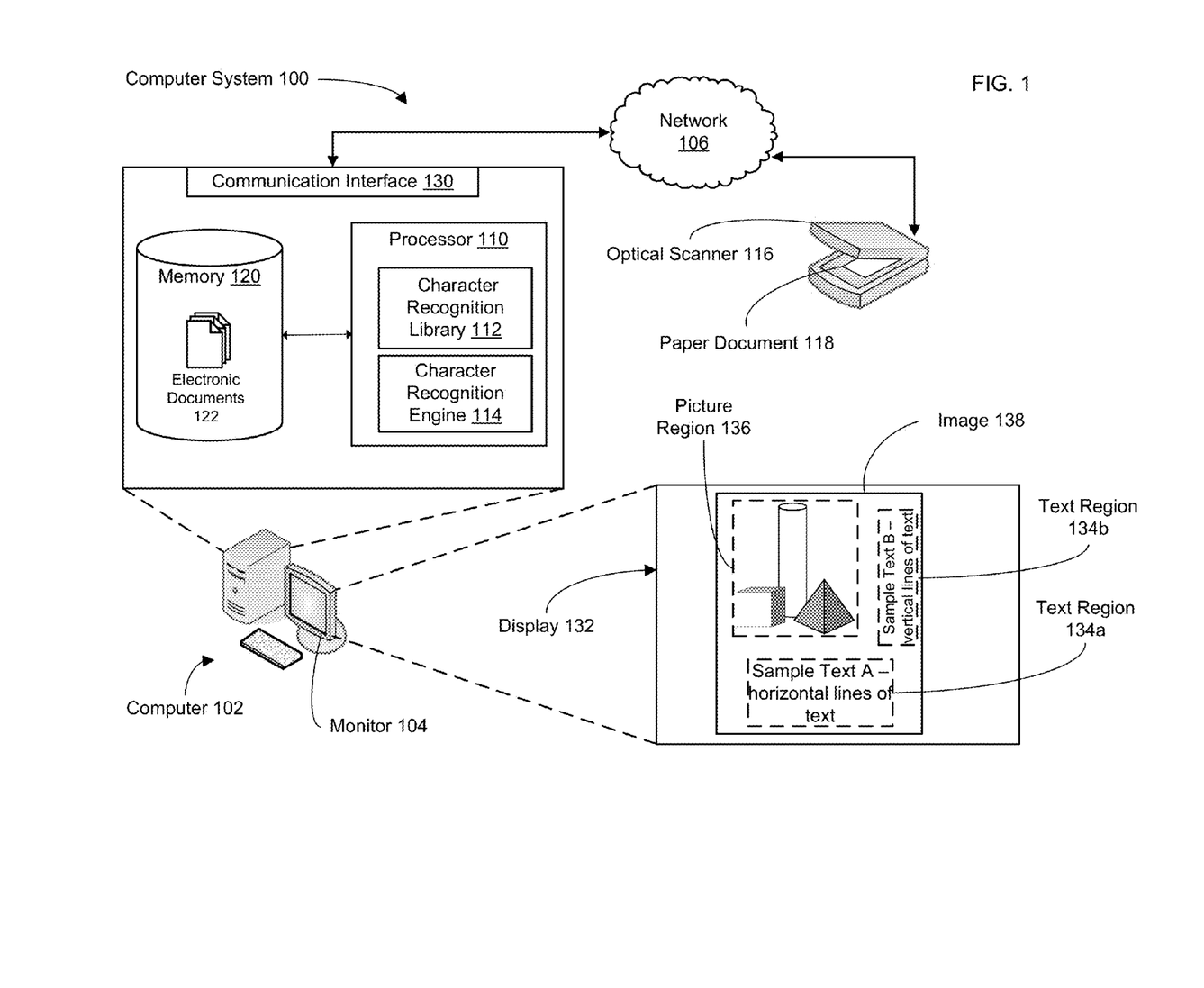
FIG. 1 is a diagram showing an example computer system for recognizing text at multiple orientations.

FIG. 1 is a diagram showing an example computer system 100 for recognizing text at multiple orientations. The computer system 100 recognizes text characters in multiple regions of an input image, where each region contains text at a different orientation. For example, an image of an optically scanned paper document may include one or more paragraphs of text running horizontally across the page and one or more lines of text running vertically up or down the page in a margin beside the paragraphs. In such an example, the paragraphs define a first region of the image, where the text is oriented horizontally in the image, and the margin text defines a second region of the image, where the text is oriented vertically in the image. In another example, the first region of text includes paragraphs with text running horizontally (i.e., at zero degrees) across the page, and the second region of text includes a line of alphanumeric characters stamped in a margin above or below the paragraphs at a non-zero angle across the margin (e.g., five degrees, ninety degrees, or another angle). In these examples, the text in the margin may represent a page number, a Bates number stamped on the page, and/or other information. In either of these examples, the system 100 can identify the first region of the image and the second region of the image, recognize characters of text in both regions, and output a text object for each region. Each resulting text object can correspond to a particular region and can include an identification of the text characters recognized in the corresponding region and an identification of the orientation of the recognized text in the corresponding region. The system 100 can perform character recognition and generate an output text object for two, three, four, or more different regions of an input image, where the text recognized in each region or at least some of the regions has a different orientation. The input image and/or an electronic document associated with the input image can be modified to include the resulting text objects. For example, each region of the image containing recognized text may be replaced by or associated with a corresponding text object. Thus, a text search of the resulting image or electronic document may search over text at multiple different orientations by searching over the text objects.

The system 100 includes a computer 102 and an optical scanner 116 communicably coupled through a network 106. The network 106 can be implemented as any form or medium of digital data communication, such as a communication network. Examples of communication networks include a local area network ("LAN") and a wide area network ("WAN"), for example, the Internet. In some embodiments, the optical scanner 116 communicates directly with the computer 102, for example through a Universal Serial Bus (USB) interface or another type of interface that does not require a network.

The computer 102 includes a central processor 110 that executes programs, performs data manipulations, and controls tasks in the computer 102. The illustrated example processor 110 includes a character recognition library 112 and a character recognition engine 114. The computer 102 also includes a memory 120, which can be volatile and/or non-volatile memory for storing data. The example memory 120 stores electronic documents 122. The computer 102 further includes a communication interface 130, which allows software and data to be communicated over the network 106 (e.g., from the optical scanner 116). The computer 102 is coupled to a monitor 104 that displays graphical information (e.g., to a user). Other features that may be included in the computer 102 are shown and discussed below with regard to the example computing system 500 of FIG. 5. While the computer 102 and the optical scanner 116 are discussed and shown as two devices, in some cases, some or all aspects of the computer 102 can be an integrated aspect of the optical scanner 116 or another device. For example, in some cases, the optical scanner includes a central processor that includes a character recognition library, a character recognition engine, and/or other features that are shown and described with respect to the computer 102.

An electronic document 122 may include text, vector images, raster images, hyperlinks, metadata, and/or other types of information. Example electronic document file formats include Portable Document File (PDF, developed by Adobe Systems Incorporated of San Jose, Calif.), PostScript (PS, developed by Adobe Systems Incorporated of San Jose, Calif.), Encapsulated PostScript (EPS), the image file formats listed below, and others. An electronic document 122 does not necessarily correspond to a file. An electronic document 122 may be stored in a portion of a file that holds other electronic documents, in a single file dedicated to the electronic document in question, or in multiple coordinated files. All or part of an electronic document 122 can be received from a remote database, the optical scanner 116, a local storage medium, and/or another source. An electronic document 122 can be generated remotely by the optical scanner or another device, or an electronic document 122 can be generated locally on the computer 102, for example, by a software application running on the processor 110. An electronic document 122 can include a scanned image of a paper document 118 or a different object generated by the optical scanner 116.

The electronic documents 122 shown include one or more images that contain text at multiple orientations. For example, an electronic document 122 may include an image with text oriented at 0°, 10°, 95°, 180°, 213°, 270°, 300°, and/or others angles. The image may correspond to all or part of a page of a document or multiple pages of a document. The electronic document 122 can include data defined using any type of image file format. Example image file formats include Bitmaps (BMP, developed by Microsoft Corporation of Redmond, Wash.), Graphics Interchange Format (GIF, developed by CompuServe of Columbus, Ohio), Tagged Image File Format (TIFF, developed by Adobe Systems Incorporated of San Jose, Calif.), Joint Photographic Experts Group (JPEG, developed by Joint Photographic Experts Group), Extended Dynamic Range Image File Format (OpenEXR, developed by Industrial Light and Magic of San Francisco, Calif.), Scalable Vector Graphics (SVG), and others. An image in an electronic document 122 can represent a grayscale and/or various color spaces (e.g., RGB, CMYK, Adobe RGB, and others). An image in an electronic document 122 can include vector objects that have object data and object attributes (e.g., stroke, fill color, texture, etc.).

The processor may include a document viewing/editing module that interacts with the memory 120, the character recognition library 112, and/or the character recognition engine 114. A document viewing/editing module can interpret, render, and/or edit electronic documents 122. In some embodiments, the document viewing/editing module allows a user to view and/or edit electronic documents 122 through a user interface. In some implementations, the document viewing/editing module is a software application for viewing and editing electronic documents, for example, Adobe® Reader® software (available from Adobe Systems Incorporated of San Jose, Calif.), Adobe® Acrobat® software (available from Adobe Systems Incorporated of San Jose, Calif.), and/or others. The document viewing/editing module may be implemented as software, hardware, firmware, or a combination of these. The document viewing/editing module can receive an electronic document 122 from the memory 120, interpret the received electronic document 122, and generate a graphical representation of the electronic document 122. For example, the graphical representation of an electronic document 122 can be presented in a display 132 on the monitor 104, as shown in FIG. 1.

The character recognition library 112 can receive instructions, and/or other types of data from a document viewing/editing module or a different module or device. For example, the document viewing/editing module can receive commands from a user and pass control of a text recognition process to the character recognition library 112, and the character recognition library 112 can store the results of the character recognition process and/or provide the results back to the document viewing/editing module. The character recognition library 112 can interact with the character recognition engine 114 to invoke, control, provide input for, and/or receive output from one or more aspects of a character recognition process. For example, the character recognition library 112 can send all or part of an electronic document and/or other input parameters to the character recognition engine 114. The character recognition library 112 can receive a response and/or other types of output from the character recognition engine 114. For example, the character recognition library 112 may receive data structures that identify text characters and properties of the text characters recognized in an electronic document. As another example, the character recognition library 112 may receive data relating to the progress, success, errors and/or quality of a character recognition process implemented by the character recognition engine 114. The character recognition library 112 may be implemented as software, hardware, firmware, or a combination of these.

The character recognition library 112 can edit an electronic document 122 based on data provided by the character recognition engine 114. For example, based on the output from the character recognition engine 114, the character recognition library 112 can modify the electronic document 122 to include one or more text objects. A text object can replace the corresponding image region in the electronic document 122, or a text object can be added to the electronic document 122 and associated with the corresponding image region. In some cases, modifying the electronic document 122 includes generating a derivative electronic document that is a modified version of the original electronic document 122. Thus, data representing the appearance and potentially other characteristics of the initial electronic document 122 is processed according to instructions contained in the character recognition library 112 and/or character recognition engine 114 to produce new data representing additional information about the appearance and content of the electronic document 122. This new data can then be stored for subsequent use in displaying or otherwise presenting the electronic document 122 to a user, searching for content in the electronic document 122, or performing other operations using the new data.

The character recognition engine 114 recognizes characters of text in an image. The character recognition engine 114 can be implemented as software, hardware, firmware, or a combination of these. In some implementations, the character recognition engine 114 is a separate software application from the document viewing/editing module and/or the character recognition library 112. In some implementations, one or more aspects of the character recognition engine 114, the character recognition library 112, and/or the document viewing/editing module are integrated in a single application or program. An example character recognition engine is Adobe® Acrobat Capture® software (available from Adobe Systems Incorporated of San Jose, Calif.).

The character recognition engine 114 can receive an input image, recognize some or all of the text characters in the input image, and generate an output that identifies the recognized text characters. The output may also include an identification of other properties of the recognized text characters. For example, the output may identify the location of the text (e.g., by coordinates), the orientation of the text (e.g., 0°, 20°, 180°, etc.), the size of the text (e.g., 8 point, 16 point, ½ inch, 16 mm, etc.), the typeface of the text (e.g., Arial, Courier, Roman, etc.), the color of the text (e.g., red, black, etc.), the direction of the text (e.g., forward, backward, etc.), and/or other properties.

The character recognition engine 114 can identify regions of an input image and identify whether each region includes text characters. Region boundaries can be determined by an iterative process that utilizes one or more boundary detection techniques. For example, region boundaries may be identified by calculating a histogram of an image (e.g., as described with respect to FIG. 2B), by analyzing pixel intensity and/or color distribution and arrangement in the image, and/or other techniques. Region boundaries may be identified by detecting changes in font size, font color, font spacing, line spacing, justification and/or centering, margin size, and/or other features.

The character recognition engine 114 can determine the orientation of characters in an image and/or in a given region and recognize characters in the image having the determined orientation. For example, the character recognition engine 114 may receive the example image 138 shown in the display 132 in FIG. 1. The image 138 includes three regions, indicated by dashed lines in FIG. 1: a first text region 134a, a second text region 134b, and a picture region 136. The first text region 134a includes text having a first orientation in the image 138, and the second text region 134b includes text having a second orientation in the image 138. The picture region 136 includes a picture of geometric shapes and does not include text. The character recognition engine 114 may identify each of the three regions 136, 134a, and 134b. The character recognition engine 114 may identify an orientation of text in one or both of the text regions 134a and 134b. In some implementations, a probable (or "guess") orientation may be provided as an input to the character recognition engine 114 by the character recognition library 112 or another module.

The orientation of text may be determined based on one or more techniques. For example, the character recognition engine 114 and/or the character recognition library 112 may determine a probable orientation of text in a given region by calculating an aspect ratio of the text region, by calculating a histogram of pixel intensity for the text region, and/or by identifying a text baseline in the text region. These techniques are discussed in more detail with regard to FIG. 2B. As another example, the character recognition engine 114 can identify the orientation of text in a text region by performing character recognition at multiple test orientations, for example, based on a sample portion of the text region. Character recognition can be performed at the test orientation that provided acceptable results and/or better results than other test orientations.

After a text orientation is identified for a given text region, the character recognition engine 114 can recognize text characters having the identified orientation in the text region. A character recognition process can automatically identify an alphanumeric character or symbol based on an image of the alphanumeric character or symbol. For example, the alphanumeric characters or symbols may be recognized by determining that an arrangement of pixel intensities and/or colors in an image corresponds to a particular alphanumeric character or symbol. For example, a character recognition process can recognize the letter "a" based on a raster image of the letter "a." The character recognition engine 114 can recognize alphanumeric characters and/or symbols relating to one or more languages (e.g., English, Mandarin, Spanish, Japanese, Hebrew, and others), typefaces, and/or font sizes and styles. The character recognition engine 114 can recognize typed or machine-printed characters, handwritten characters, computer-generated characters, and/or others. Based on the results of a character recognition process, the character recognition engine 114 can generate an output that identifies the recognized text characters and properties of the recognized text characters. For example, the output of a character recognition process executed for the first text region 134a includes an identification of the recognized text ("Sample Text A—horizontal lines of text") and an identification of the orientation of the recognized text (zero degrees). The output of the character recognition engine 114 may also identify coordinates of the identified regions of the image, the type of content in each identified region, and/or other data. For example, the output of the character recognition engine 114 may identify the coordinates of the picture region 136, the first text region 134a, and the second text region 134b. The output may indicate that the picture region 136 includes a picture and the first text region 134a includes recognized text. In some cases, the output may identify one or more regions (e.g., second text region 134b) that are candidates for text recognition at a different orientation.

The character recognition engine 114 can perform text recognition for each region of an image that includes text, even though the text in each region has a different orientation than the text in other regions. In some implementations, recognizing text characters includes rotating all or part of the image. In some cases, the character recognition engine 114 automatically attempts character recognition at different orientations for each region of the image. For example, after the character recognition engine 114 recognizes the horizontal lines of text in the first text region 134a, the character recognition engine 114 may determine that the second text region 134b does not contain horizontally oriented text and then automatically determine whether the second text region 134b contains text at a different orientation. In such a case, the character recognition engine 114 identifies the vertical orientation of the text in the second text region 134b and then performs character recognition for that region. In this example, the output from the character recognition engine 114 indicates that the first text region 134a includes recognized text at zero degrees and the second text region 134b includes recognized text at ninety degrees.

However, in some cases, the character recognition engine 114 attempts character recognition at a second, third, fourth, or other orientation when prompted, for example, by the character recognition library 112. For example, after the character recognition engine 114 recognizes the horizontal lines of text in the first text region 134a, the character recognition engine 114 may attempt to recognize characters having the same orientation in the second text region 134b and determine that the results are unacceptable (e.g., because many of the characters are unrecognized at that orientation). As another example, after the character recognition engine 114 recognizes the horizontal lines of text in the first text region 134a, the character recognition engine 114 may otherwise determine that the second text region 134b does not include text at the same orientation and not attempt character recognition in the second text region 134b. In these example cases where the character recognition engine 114 does not recognize text in the second text region 134b, the character recognition engine 114 provides an output indicating that the first text region 134a includes recognized text at a horizontal orientation and the second text region 134b is unrecognized. Based on the output, the character recognition library 112 can perform operations to determine that the second text region 134b includes text oriented vertically on the page and then instruct the character recognition engine 114 to perform character recognition for the second text region 134b. In such a case, the character recognition library 112 may provide an identification of the vertical orientation as an input to the character recognition engine 114. This scenario is discussed further with respect to FIG. 3.

In one aspect of operation, an image 138 of the paper document 118 is obtained by the optical scanner 116. The optical scanner 116 generates an electronic document 122 that includes the scanned image 138. The electronic document 122 is communicated to the computer 102 through the network 106 and stored in the memory 120. A document viewing/editing module retrieves the electronic document 122 from the memory 120 and displays a graphical representation of the image 138. The document viewing/editing module receives a request to perform character recognition on all or part of the electronic document 122. The document viewing/editing module passes control of the character recognition process to the character recognition library 112. The character recognition library 112 sends all or part of the electronic document 122 including all or part of the image 138 to the character recognition engine 114. In some cases, additional input data is provided to the character recognition engine 114. The character recognition engine 114 identifies the three regions 134a, 134b, and 136 and determines that the first text region 134a contains lines of text oriented horizontally across the page. The character recognition engine 114 recognizes the text in the first text region 134a and returns an output to the character recognition library 112 identifying the recognized text and the three identified regions of the image 138. The character recognition library 112 replaces the first text region 134a of the image 138 with a text object that identifies the recognized text and its properties. The character recognition library 112 determines that the second text region 134b includes lines of text oriented vertically in the image. The character recognition library 112 sends to the character recognition engine 114 all or part of the electronic document 122 including all or part of the image 138. In some cases, other input data, such as an identification of the orientation of text in the second text region 134b, is also provided to the character recognition engine 114. The character recognition engine 114 recognizes the text in the second text region 134b and returns an output to the character recognition library 112 that includes an identification of the recognized text and its properties. The character recognition library 112 replaces the second text region 134b of the image 138 with a text object that identifies the text recognized in that region and the properties of the text recognized in that region.

Figure 2A:
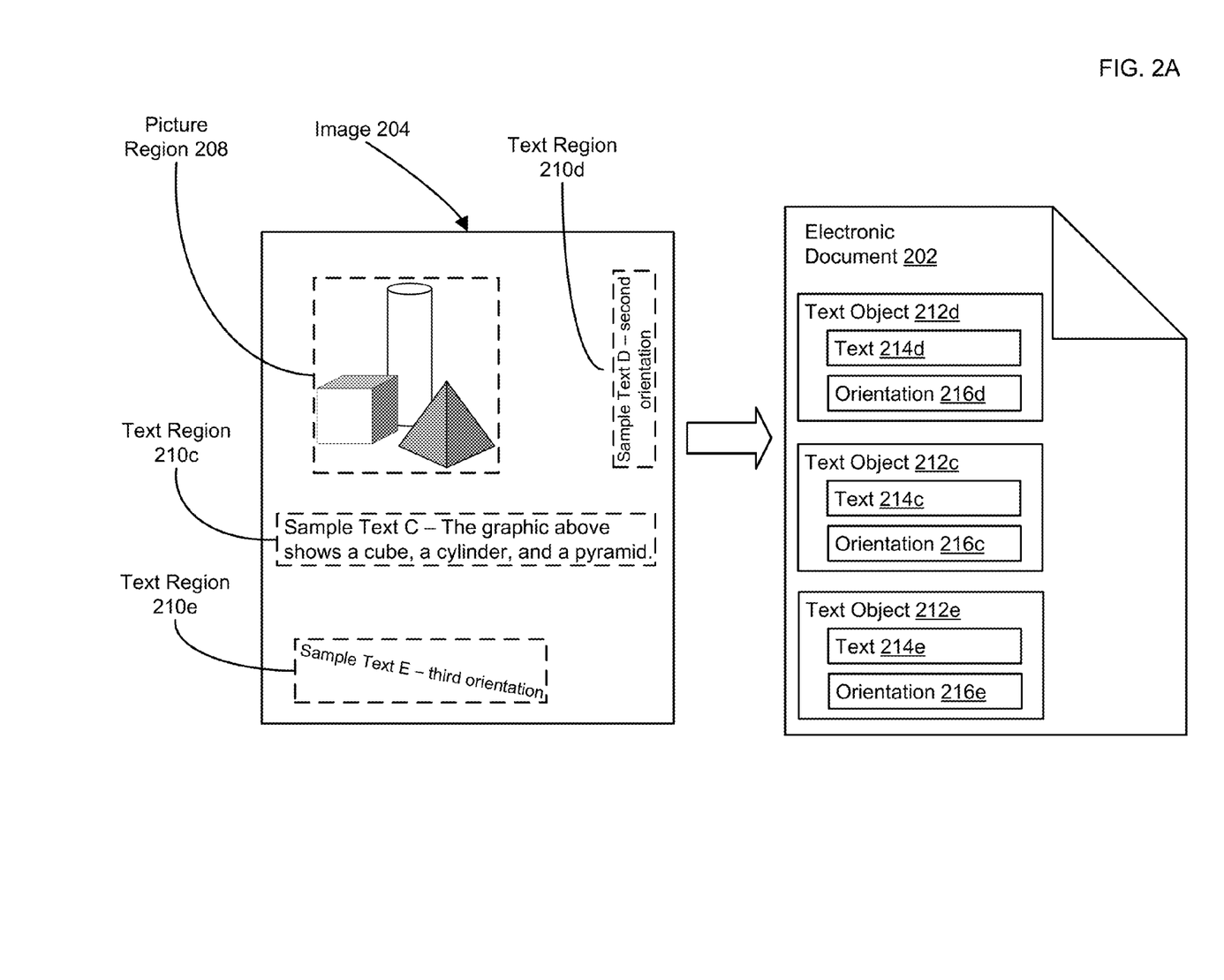
FIG. 2A is a diagram showing an example image.

FIG. 2A is a diagram showing an example image 204 that includes text at multiple orientations. The image 204 is a graphical representation of an image object included in an electronic document. The image 204 includes four regions, indicated by dashed lines in FIG. 2A: a picture region 208, a first text region 210c, a second text region 210d, and a third text region 210e. In the example shown, each text region 210c, 210d, and 210e includes text at a different orientation. The first text region 210c includes multiple lines of text at a first orientation—running horizontally across the page. The second text region 210d includes multiple lines of text at a second orientation—running vertically on the side of the page. The third text region 210e includes a single line of text at a third orientation—running at an angle across the bottom of the page. The picture region 208 includes a picture of geometric objects but does not include text. The example image object contains image data that, when presented graphically, represents text characters as shown in FIG. 2. However, prior to executing a text recognition process on the image object, the image object does not include alphanumeric data that represents the text characters shown in the image 204.

The system 100 shown in FIG. 1 can identify the four regions of the image 204 and recognize the text characters in each of the three text regions 210c, 210d, and 210e. In some instances, in addition to the regions that contain text at different orientations, text is recognized in two or more regions containing text having the same orientation. For example, the image 204 could include an additional (fourth) text region containing text oriented at the first orientation, as in the text region 210c. In other implementations, all text having the same orientation may be grouped into a single region.

Text objects can be generated based on the text characters recognized in each of the three text regions 210c, 210d, and 210e. For example, FIG. 2A shows a schematic diagram of an example electronic document 202 that includes three text objects 212c, 212d, and 212e representing the three regions 210c, 210d, and 210e, respectively. The text objects 212c, 212d, and 212e are generated based on character recognition of the image 204. The text objects 212c, 212d, and 212e may be included in the electronic document 202 in addition to all or part of the image 204 and/or other data. The electronic document 202 can also include other data that is not shown in the diagram in FIG. 2A. A document viewing/editing module can render a graphical representation of the image 204 based on the modified electronic document 202. The electronic document 202 can also allow a text search over all three text regions of the image 204 by searching the text objects 212c, 212d, and 212e included in the electronic document 202.

Each text object includes an identification of the text characters recognized in the associated region of the image 204 and properties of the recognized text characters. For example, a text object may indicate the location of the text in an image, the orientation of the text, the size of the text, and/or other properties. The example text object 212c includes a text attribute 214c ("Sample Text C—The graphic above shows a cube, a cylinder, and a pyramid.") and an orientation attribute 216c (indicating the slope of the first orientation). The example text object 212d includes a text attribute 214d ("Sample Text D—second orientation.") and an orientation attribute 216d (indicating the slope of the second orientation). The example text object 212e includes a text attribute 214e ("Sample Text E—third orientation") and an orientation attribute 216e (indicating the slope of the third orientation).

An identification of text characters included in a text object can be a set of values that each represent the individual text character recognized in a corresponding image region. For example, the text object 212c can include a set of values, where each value represents one of the individual characters recognized in the region 210c. In particular, the identification of text characters in the text object 212c may include a value that represents the letter "S," another value that represents the letter "a," another value that represents the letter "m," and so forth. A value that represents a letter can be the actual letter itself (e.g., "S," "a," "m," etc.) or another value that is associated with the letter by a mapping or text encoding scheme. Example text encoding schemes include American Standard Code for Information Interchange (ASCII), Unicode, and others. For example, the value can be a binary, decimal, hexadecimal, or another type of value that corresponds to the recognized letter. The identification of text characters may also include values that correspond to features of text other than alphanumeric characters. For example, the identification of text characters may also include values that correspond to an end of a paragraph, a space between letters, a null value, a tab value, a symbol, or another text feature.

Figure 2B:
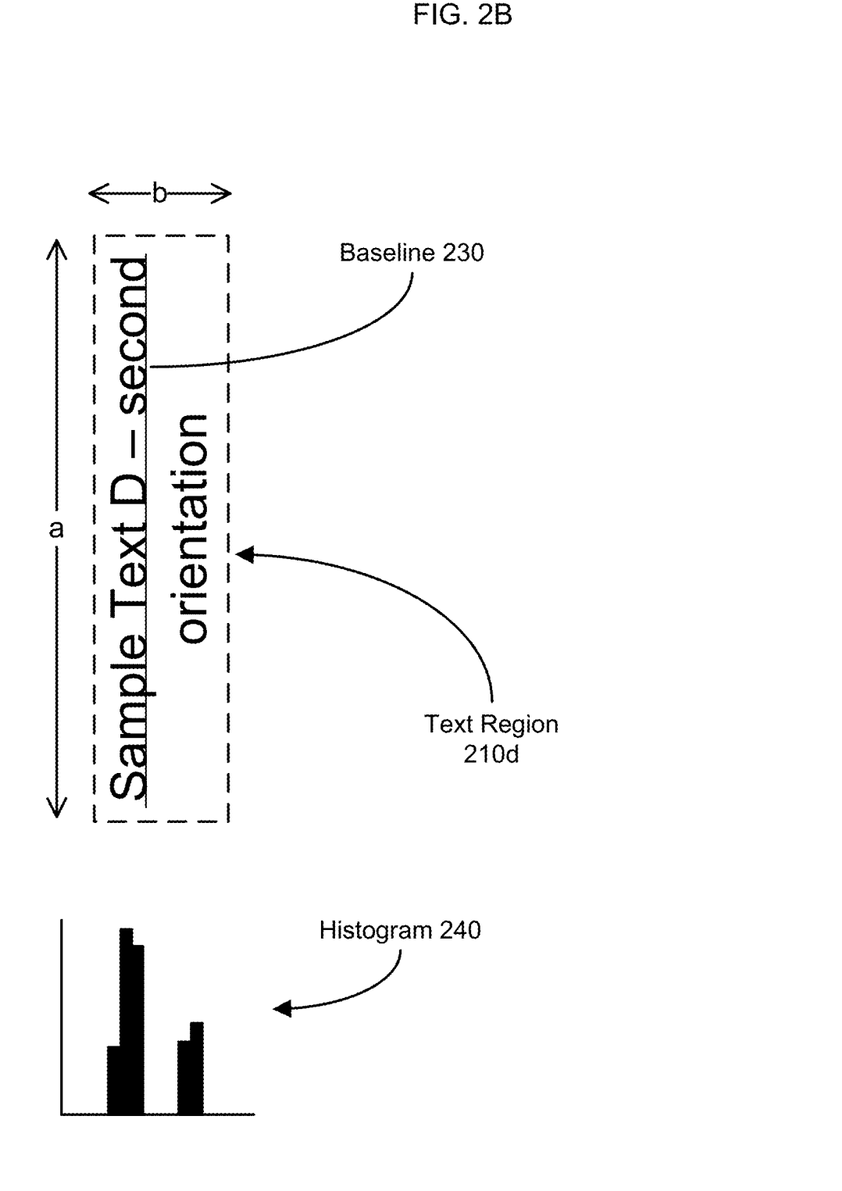
FIG. 2B is a diagram showing example techniques for identifying an orientation of text in an image.

FIG. 2B is a diagram showing example techniques for identifying an orientation of text in an image. Three example techniques are shown with reference to the example text region 210d. These techniques and/or other techniques can be executed by a character recognition library and/or by a character recognition engine to identify a probable orientation for a region of text.

One technique for identifying a probable orientation of text includes calculating an aspect ratio of the region. An aspect ratio can be calculated by dividing the width of an image (or image region) by the height of the image (or image region). For example, the width of the text region 210d is b and the height of the text region 210d is a as shown in FIG. 2B. Thus, the aspect ratio for the text region 210c is expressed symbolically as b:a. A large aspect ratio (e.g., 5:1, 10:1, or others) may indicate that the image region contains one or more horizontal lines of text. A small aspect ratio (e.g., 1:5, 1:10, or others) may indicate that the image region contains one or more vertical lines of text. Thus, one or more probable orientations of text may be identified based on the aspect ratio. For example, if the aspect ratio of the text region 210d were calculated to be 1:4, the probable orientations of text in the text region 210d may include ninety degrees (i.e., running vertically up the page) and 270 degrees (i.e., running vertically down the page). The aspect ratio may also be used to determine whether an image region contains text. For example, an aspect ratio at or near one (e.g., 3:4, 4:3, 1:1, or others) may indicate that it is unlikely that the image region contains lines of text, while higher or lower aspect ratios may indicate that the image region likely does include lines of text.

A second technique for identifying a probable orientation of text includes calculating a histogram of pixel values for rows and/or columns of an image region. A histogram can be calculated by dividing the image region into a grid and combining (e.g., summing) the pixel values for each row or column of the grid. For example, the histogram 240 in FIG. 2B is included for purposes of illustration and discussion. Each bar in the histogram 240 represents the sum of pixel values of a column of an image region containing two vertical lines of text, similar to the text region 210d. The histogram 240 shows a low amplitude region between two high amplitude regions, suggesting two lines of text running in the direction of the pixel columns for which the histogram was calculated. Based on the histogram 240, the probable orientations of text for the corresponding image region may include ninety degrees (i.e., running vertically up the page) and 270 degrees (i.e., running vertically down the page). Moreover, a histogram can be used to determine that a region likely does not contain text at a given orientation. For example, if a histogram has a relatively uniform or non-periodic structure, this may indicate that the image region does not contain lines of text oriented along the dimension that the histogram was calculated.

A third technique for identifying a probable orientation of text includes identifying a baseline of a line of text. In some implementations, identifying a baseline can resolve ambiguity and/or improve the precision and/or accuracy of an orientation determined by another method. For example, the aspect ratio calculation, the histogram calculation, and or other calculations may indicate the probable orientation of text with some ambiguity and/or with low precision. The histogram calculation may indicate that text is running horizontally across the page, oriented at either zero degrees or 180 degrees on the page. Text oriented at zero degrees can be distinguished from text oriented at 180 degrees by identifying a baseline of the text. An example baseline 230 is shown in FIG. 2B. The baseline can distinguish the bottoms of a line of text from the top of a line of text. For example, in the English language and other languages, the bottom of a line of text is typically "smooth" and uniform relative to the top of a line of text. In the example shown in FIG. 2B, the line of text "Sample Text D—second" includes one letter ("p") that descends below the baseline 230. The bottom of all other letters in the line touch the baseline 230 but do not descend below the baseline 230. By contrast, the top of the line of text is less uniform because the tops of the letters are at varying heights.

One or more of the techniques shown in FIG. 2B can be used alone or in combination with other techniques to quickly determine whether an image region is likely to include text and/or to identify a probable orientation of text in the region. For example, an aspect ratio calculation may indicate that a region is likely to include text, a histogram calculation may indicate that the region contains a single line of text running at an angle of five degrees in the region, and a baseline may be used to distinguish the top from the bottom of the line of text. In some cases, identifying a probable orientation (for example, by one of the techniques shown in FIG. 2B) is performed as an alternative to or in addition to attempting character recognition at multiple different orientations. In some implementations, one or more of the techniques shown in FIG. 2B may be more time efficient than attempting character recognition at multiple different orientations.

Figure 3:
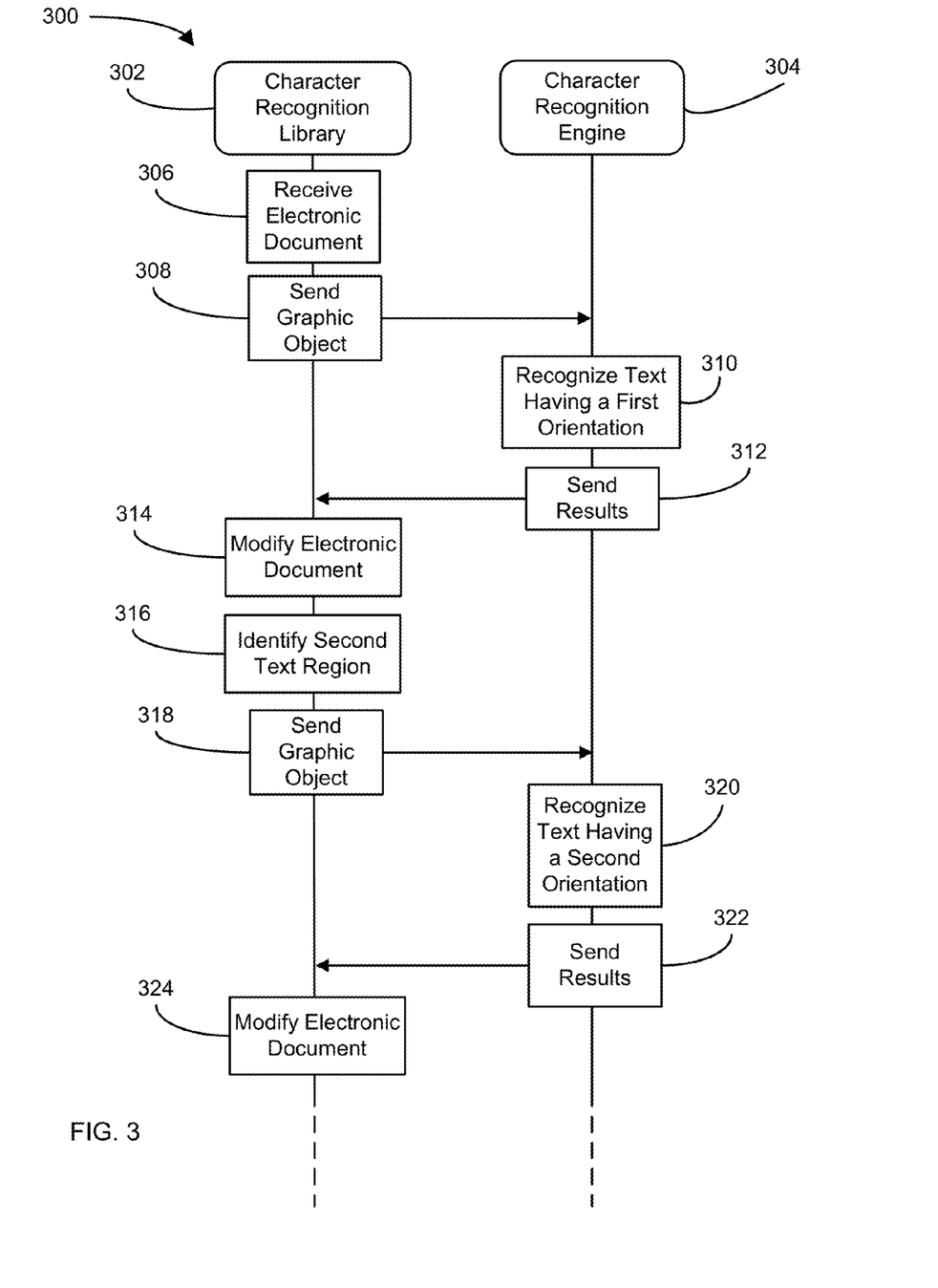
FIG. 3 is a signaling and flow diagram showing an example technique for recognizing text at multiple orientations in an image.

FIG. 3 is a signaling and flow diagram 300 showing an example technique for recognizing text at multiple orientations in an image. The diagram 300 shows operations and communications of a character recognition library 302 and a character recognition engine 304. For example, the character recognition library 302 can be the character recognition library 112 of FIG. 1, and the character recognition engine 304 can be the character recognition engine 114 of FIG. 1. The character recognition library 302 and the character recognition engine 304 may be implemented as two or more aspects of a single software application or program, as two or more separate software applications or programs, or otherwise.

At 306, the character recognition library 302 receives an electronic document. The electronic document may be received from a local memory or storage medium, from a remote database, from an input/output device such as an optical scanner, or from another source. The electronic document includes an image that contains multiple regions of text. At 308, the character recognition library 302 sends data to the character recognition engine 304. The data can include all or part of the electronic document, all or part of the image, and/or other data. At 310, the character recognition engine 304 identifies multiple regions in the electronic document and recognizes text having a first orientation in one or more of the regions.

At 312, the character recognition engine 304 sends the results of character recognition to the character recognition library 302. The results can include one or more text objects, an identification of the recognized characters, an identification of properties of the recognized characters, an identification of one or more regions in the image, an identification of the content of each region, and/or other data. The results may indicate that no text was recognized at the first orientation in one or more of the regions of the image. At 314, the character recognition library 302 modifies the electronic document to include the results of character recognition. For example, the character recognition library 302 can replace a region of the image with a text object that includes the text recognized in the region.

At 316, the character recognition library 302 identifies a second region of text in the image. For example, the character recognition library 302 can determine that one of the regions identified by the character recognition engine 304 contains text. The second region may be one of the regions where no text was recognized at the first orientation. The character recognition library 302 can identify that the second region includes text and/or a probable orientation of text in the second region by calculating an aspect ratio of the second region, by calculating a histogram of the second region, by identifying a text baseline in the second region, and/or by another technique. At 318, the character recognition library 302 sends data to the character recognition engine 304. The data can include all or part of the modified electronic document, all or part of the original electronic document, all or part of the modified image, all or part of the original image, an identification of the text region (identified at 316), an identification of a probable orientation of the text in the identified text region, and/or other data.

At 320, the character recognition engine 304 recognizes text characters having a second orientation in the region identified by the character recognition library 302. In some instances, the second orientation corresponds to a probable orientation of text identified by the character recognition library 302 (at 316). At 322, the character recognition engine 304 sends the results of character recognition to the character recognition library 302. The results can include one or more text objects, an identification of the recognized characters, an identification of properties of the recognized characters, an identification of one or more regions in the image, an identification of the content of each region, and/or other data. At 324, the character recognition library 302 modifies the electronic document to include the results of the character recognition. For example, the character recognition library 302 can replace a region of the image with a text object that includes the text recognized in the region.

In some implementations, the character recognition library 302 and/or the character recognition engine 304 perform additional and/or different operations. For example, the character recognition engine 304 may recognize text having a first orientation (310), text having a second orientation (320), and/or text having another orientation before sending results to the character recognition library 302 (312). As another example, the character recognition library 302 may, at 324, modify the electronic document to include the results of both character recognition operations.

Figure 4A:
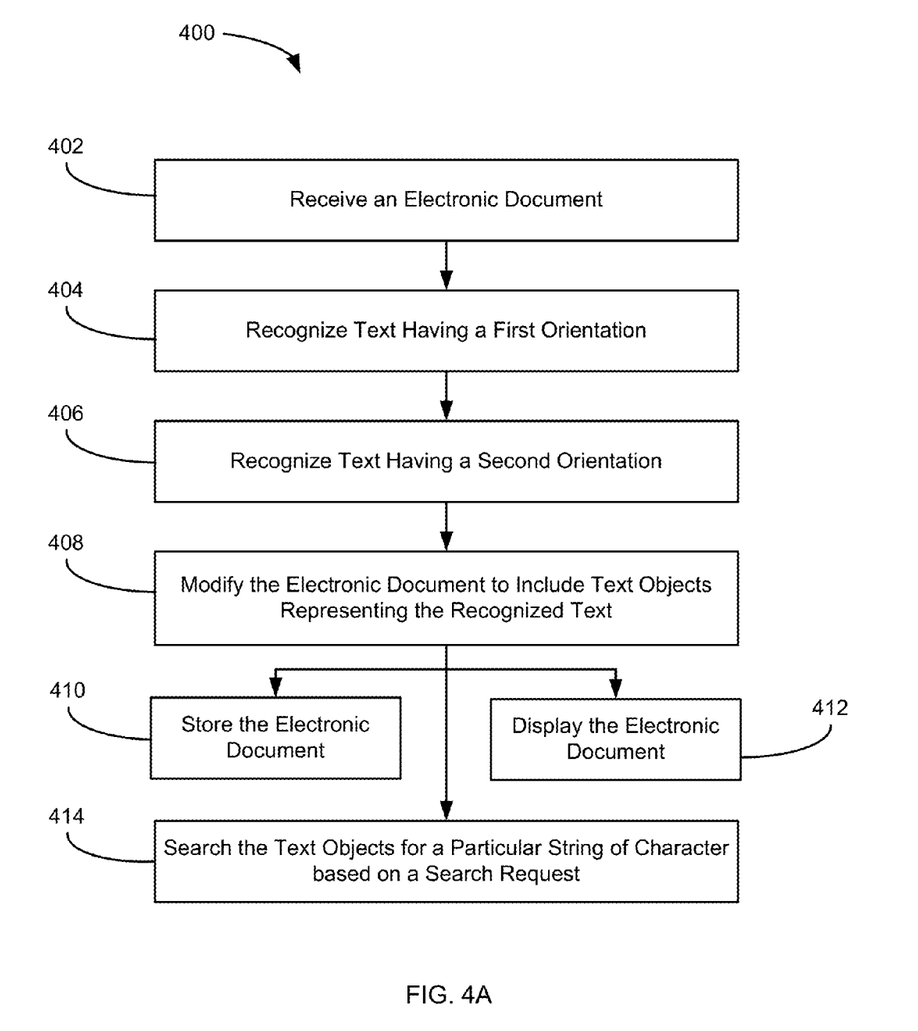
FIG. 4A is a flow chart showing an example process for recognizing text at multiple orientations in an image.

FIG. 4A is a flow chart showing an example process 400 for recognizing text at multiple orientations in an image. The process 400 can be implemented by the system 100 of FIG. 1 or by a different system. In some implementations, the process 400 can include fewer, additional, and/or different operations.

At 402, an electronic document is received. Receiving the electronic document can include performing an optical scan of a document (e.g., a paper document, a printed medium, and/or others), retrieving electronic data from a machine-readable medium (e.g., a memory, a portable storage medium, and/or others), generating an electronic document, and/or other operations. The electronic document includes an image object (e.g., a raster image object, a vector image object, or another type of image object) that includes two or more regions of text. A first text region includes text having a first orientation in the image (e.g., horizontal), and a second text region includes text having a second orientation in the image (e.g., vertical).

At 404, text characters having the first orientation in the image are recognized in the first text region. Recognizing text in the first text region can include (1) identifying that the first region contains text and/or (2) identifying the first orientation. In some implementations, recognizing text in the first region includes sending the image object to an optical character recognition engine and receiving a first dataset from the optical character recognition engine. The first dataset received from the optical character recognition engine can identify the first orientation, the first region, the recognized text characters, and one or more unrecognized regions of the image object. At least one of the unrecognized regions can include the second region.

At 406, text characters having the second orientation in the image are recognized in the second text region. Recognizing text in the second text region can include (1) identifying that the second region contains text and/or (2) identifying the second orientation. In some implementations, recognizing the second plurality of text characters includes identifying that an unrecognized region contains text, sending at least a portion of the unrecognized region to the optical character recognition engine, and receiving a second dataset from the optical character recognition engine. The second dataset can identify the second orientation, the second region, and the recognized text characters.

At 408, the electronic document is modified to include text objects representing the recognized text. A first text object included in the electronic document identifies the text characters recognized in the first text region. The first text object can also include an identification of the first orientation and an identification of the first region. A second text object included in the electronic document identifies the text characters recognized in the second text region. The second text object can also include an identification of the second orientation and an identification of the second region. The process 400 can also include identifying text having a different (e.g., third, fourth, fifth, etc.) orientation in a different (e.g., third, fourth, fifth, etc.) region of the image object. In such cases, the process 400 can also include modifying the electronic document to include one or more additional text objects that include an identification of the text characters recognized in the different text region.

Modifying an electronic document can include adding the text objects to an existing electronic document, replacing text regions of the image with the text objects, and/or other operations. For example, modifying the electronic document can include storing in the electronic document the first text object, the second text object, an identification of the first orientation, an identification of the second orientation, an identification of the first region, and an identification of the second region. In some implementations, modifying the electronic document includes generating a derivative electronic document that includes the text objects. Modifying the electronic document can include repurposing text content from one or more source documents. For example, text content from multiple printed documents (e.g., newspapers, books, paper archives, and/or others) can be assimilated and repurposed as one or more forms of digital media. Modifying the electronic document can include converting all or part of the data included in the electronic document to a different file format. In some instances, the recognized text content can be converted and/or stored in a non-text format. For example, the text content can be converted to speech and stored using an audio file format. The audio file may be presented acoustically using an audio device.

After the electronic document is modified to include an identification of the recognized text characters, the electronic document may be stored (410), displayed (412), and/or searched (414). The modified electronic document can be stored as all or part of a single file or as all or part of multiple different files that may be stored in multiple different locations using different file formats. Displaying the electronic document may include displaying a graphical representation of the modified electronic document with the first plurality of text characters having the first orientation in the graphical representation and the second plurality of text characters having the second orientation in the graphical representation. Searching the electronic document may include searching the first, second and/or third text object to identify a particular string of text characters based on a request to find the string of characters in the electronic document. In some cases, the recognized text content can be used for electronic data indexing, data mining, and/or other data management tasks. For example, the text content recognized in the image can be used to determine where and/or how to store the electronic document in a database or another information storage system.

Figure 4B:
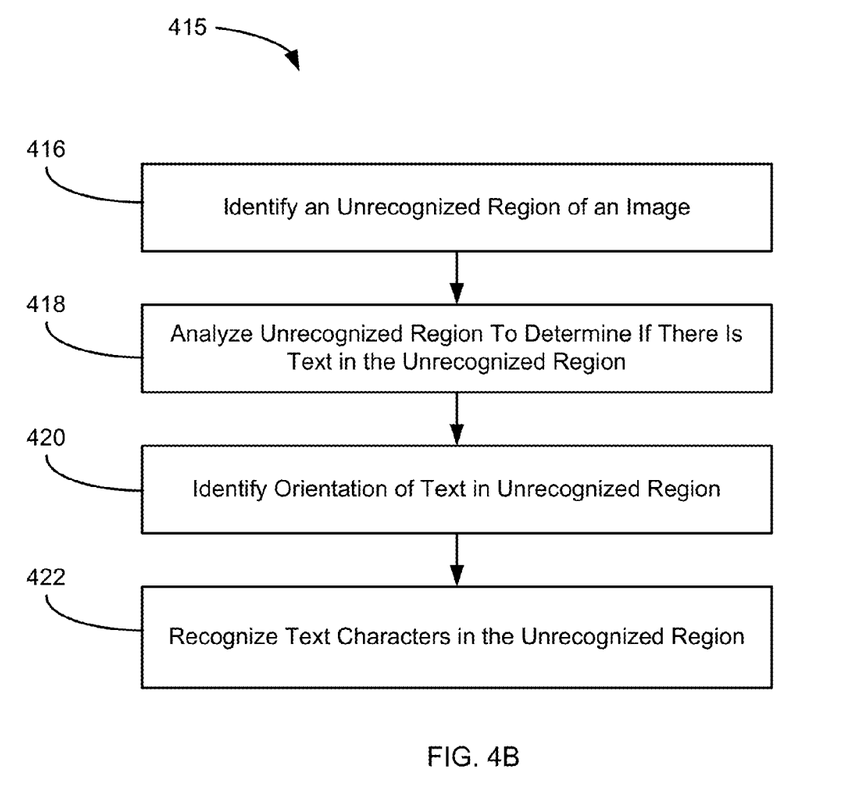
FIG. 4B is a flow chart showing an example process for recognizing text characters in an image region.

FIG. 4B is a flow chart showing an example process 415 for recognizing text characters in an image region. For example, all or part of the process 415 can be used to recognize text in operation 404 and/or operation 406 in the process 400 in FIG. 4A. The process 415 can be implemented by the system 100 of FIG. 1 or by a different system. In some implementations, the process 415 can include fewer, additional, and/or different operations.

At 416, an unrecognized region of an image is identified. The unrecognized region is a region of an image where no text has been recognized. In some cases, the image includes one or more other regions where text has been recognized (i.e., recognized regions). At 418, the unrecognized region is analyzed to determine if the unrecognized region is likely to contain text. For example, the unrecognized region can be analyzed by calculating an aspect ratio for the region, by calculating a histogram for the region, and/or by another technique. At 420, an orientation of text in the unrecognized region is identified. For example, the orientation of text in the unrecognized region may be determined based on an aspect ratio of the unrecognized region, a histogram of the region, a text baseline identified in the region, and/or other information. Additionally or alternatively, the orientation of text in the unrecognized region may be determined by attempting character recognition in a portion of the unrecognized region at multiple test orientations and choosing the test orientation that gives the best results. At 422, text characters are recognized in the unrecognized region. For example, alphanumeric characters and/or symbols can be recognized printed, handwritten, and/or computer-generated images of the alphanumeric characters and/or symbols.

Figure 5:
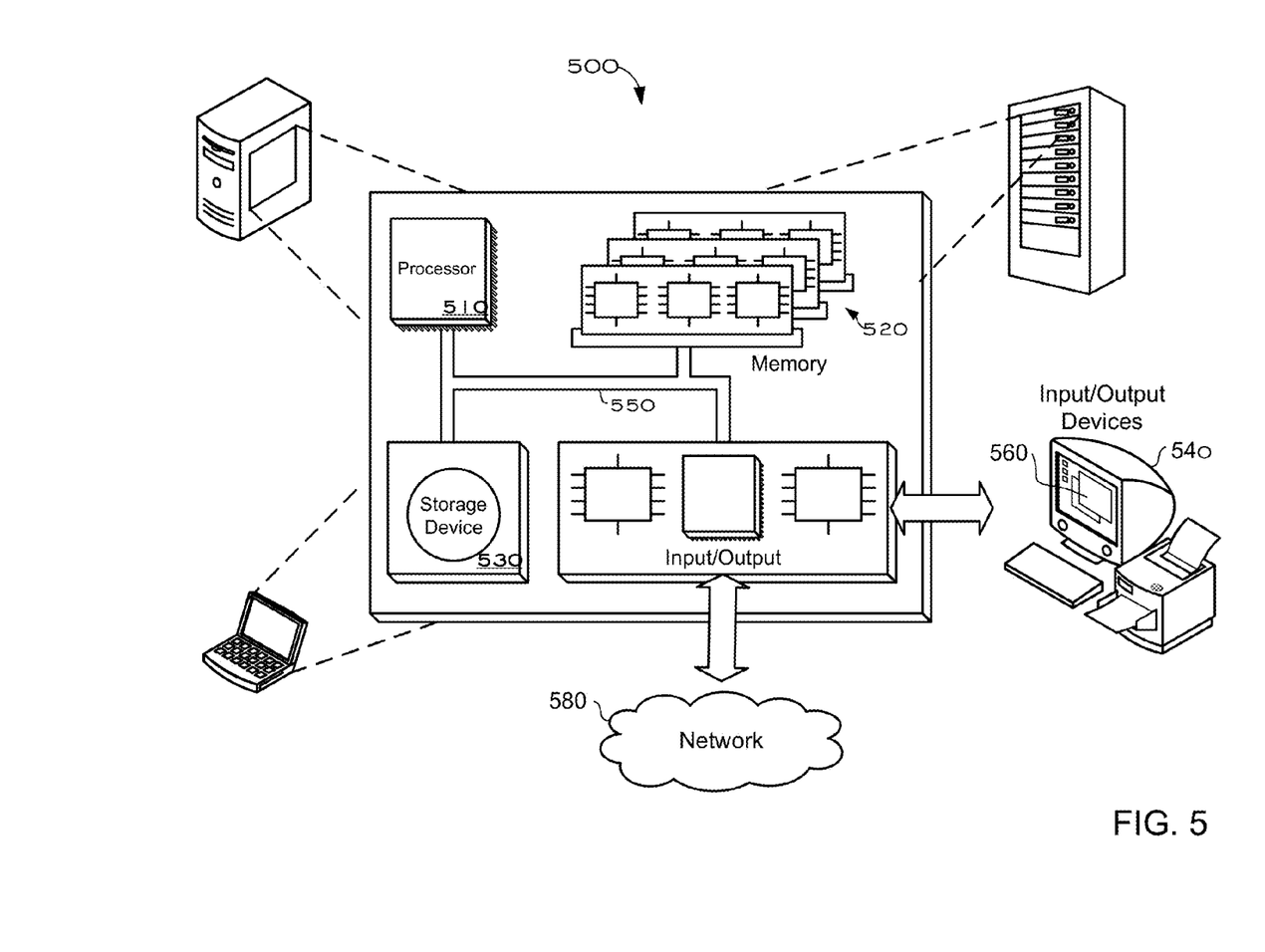
FIG. 5 is a diagram showing an example computer.

An example computer system is shown in FIG. 5, which shows a block diagram of a programmable processing system (system) 500 suitable for implementing apparatus or performing methods of various aspects of the subject matter described in this specification. For example, in some implementations, the system 500 performs one or more of the operations described herein for recognizing text at multiple orientations in an electronic document. The example system 500 includes a processor 510, memory 520, a storage device 530, and one or more input/output devices 540. Each of the components 510, 520, 530, and 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output devices 540.

The memory 520 is a computer readable medium such as volatile or non-volatile memory that stores information within the system 500. The memory 520 can store data structures representing files, electronic documents and other types of information. The storage device 530 is capable of providing persistent storage for the system 500. The storage device 530 may be a floppy disk device, a hard disk device, an optical disk device, or a tape device, or other suitable persistent storage means. The input/output devices 540 provide input/output operations for the system 500. In some implementations, the input/output devices 540 include a keyboard, an optical scanner, and/or pointing device. In other implementations, the input/output devices 540 include a display unit for displaying graphical user interfaces 560. The system 500 can be connected to a network 580, such as the Internet, an intranet, or an ad hoc network. Information can be accessed and read from the network 580, such as electronic documents and their contents. The system 500 can connect through the network 580 to a remote computer system or database.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. In some cases, recognizing text at multiple orientations may be implemented by software, hardware, firm, or a combination of these executed on a scanner or another peripheral device.

What is claimed is:

1. A computer-implemented method comprising:
   recognizing, in a first region of an image, a first plurality of text characters having a first orientation in the image;
   recognizing, in a second region of the image, a second plurality of text characters having a second orientation in the image; and
   generating an electronic document that includes:
   a first text object identifying the recognized first plurality of text characters; and
   a second text object identifying the recognized second plurality of text characters.

2. The method of claim 1, wherein generating the electronic document that includes the first text object and the second text object includes modifying an existing electronic document to include the first text object and the second text object.

3. The method of claim 2, wherein the existing electronic document includes the image, and the method further includes accessing the image in the existing electronic document before recognizing the first plurality of text characters or the second plurality of text characters.

4. The method of claim 1, wherein recognizing the first plurality of text characters includes determining the first orientation, and recognizing the second plurality of text characters includes determining the second orientation.

5. The method of claim 1, wherein the first text object further includes data indicating the first orientation, and the second text object further includes data indicating the second orientation.

6. The method of claim 1, wherein the first orientation is perpendicular to the second orientation.

7. The method of claim 1, wherein recognizing the first plurality of text characters includes recognizing text that runs horizontally on a page, and recognizing the second plurality of text characters includes recognizing text that runs vertically on the page.

8. A computer program product, encoded on a non-transitory computer-readable medium, operable to cause data processing apparatus to perform operations comprising:
   recognizing, in a first region of an image, a first plurality of text characters having a first orientation in the image;
   recognizing, in a second region of the image, a second plurality of text characters having a second orientation in the image; and
   generating an electronic document that includes:
   a first text object identifying the recognized first plurality of text characters; and
   a second text object identifying the recognized second plurality of text characters.

9. The computer program product of claim 8, wherein generating the electronic document that includes the first text object and the second text object includes modifying an existing electronic document to include the first text object and the second text object.

10. The computer program product of claim 9, wherein the existing electronic document includes the image, and the operations further include accessing the image in the existing electronic document before recognizing the first plurality of text characters or the second plurality of text characters.

11. The computer program product of claim 8, wherein recognizing the first plurality of text characters includes determining the first orientation, and recognizing the second plurality of text characters includes determining the second orientation.

12. The computer program product of claim 8, wherein the first text object further includes data indicating the first orientation, and the second text object further includes data indicating the second orientation.

13. The computer program product of claim 8, wherein the first orientation is perpendicular to the second orientation.

14. The computer program product of claim 8, wherein recognizing the first plurality of text characters includes recognizing text that runs horizontally on a page, and recognizing the second plurality of text characters includes recognizing text that runs vertically on the page.

15. A system comprising:
   a memory; and
   one or more processors configured to perform operations in accordance with instructions stored on the memory, the operations including:
      recognizing, in a first region of an image, a first plurality of text characters having a first orientation in the image;
      recognizing, in a second region of the image, a second plurality of text characters having a second orientation in the image; and
      generating an electronic document that includes:
         a first text object identifying the recognized first plurality of text characters; and
         a second text object identifying the recognized second plurality of text characters.

16. The system of claim 15, further comprising a display device, the operations further including displaying the electronic document on the display device.

17. The system of claim 15, the operations further including storing the electronic document in the memory.

18. The system of claim 15, wherein generating the electronic document that includes the first text object and the second text object comprises modifying an existing electronic document to include the first text object and the second text object.

19. The system of claim 15, wherein the first orientation is perpendicular to the second orientation.

\* \* \* \* \*